(12) United States Patent
Clüsserath et al.

(10) Patent No.: US 9,718,567 B2
(45) Date of Patent: Aug. 1, 2017

(54) METHOD AND DEVICE FOR PRODUCING CONTAINERS WHICH ARE FILLED WITH A LIQUID FILLING SUBSTANCE

(75) Inventors: Ludwig Clüsserath, Bad Kreuznach (DE); Wilfried Ehmer, Dortmund (DE)

(73) Assignee: KHS GMBH, Dortmund (DE)

( * ) Notice: Subject to any disclaimer, the term of this patent is extended or adjusted under 35 U.S.C. 154(b) by 602 days.

(21) Appl. No.: 13/982,823

(22) PCT Filed: Jan. 17, 2012

(86) PCT No.: PCT/EP2012/000163
§ 371 (c)(1),
(2), (4) Date: Jul. 31, 2013

(87) PCT Pub. No.: WO2012/104018
PCT Pub. Date: Aug. 9, 2012

(65) Prior Publication Data
US 2014/0157726 A1    Jun. 12, 2014

(30) Foreign Application Priority Data

Jan. 31, 2011 (DE) .................. 10 2011 009 888
Jan. 31, 2011 (DE) .................. 10 2011 009 889
(Continued)

(51) Int. Cl.
*B65B 5/02* (2006.01)
*B65B 3/02* (2006.01)
(Continued)

(52) U.S. Cl.
CPC .............. *B65B 5/02* (2013.01); *B29C 49/46* (2013.01); *B29D 22/003* (2013.01); *B65B 3/02* (2013.01);
(Continued)

(58) Field of Classification Search
CPC ......... B29C 49/06; B29C 49/12; B29C 49/46; B65B 3/22; B65B 3/02; B65B 3/022
(Continued)

(56) References Cited

U.S. PATENT DOCUMENTS

| 4,076,071 A | 2/1978 | Rosenkranz et al. |
| 4,883,631 A | 11/1989 | Ajmera |

(Continued)

FOREIGN PATENT DOCUMENTS

| CA | 1288913 C | 9/1991 |
| DE | 2352926 | 4/1975 |
| DE | 3729166 A1 | 4/1988 |
| DE | 4212583 | 10/1993 |
| DE | 4340291 | 6/1995 |
| DE | 60008135 T2 | 7/2004 |

(Continued)

*Primary Examiner* — Alison L Hindenlang
*Assistant Examiner* — Lawrence D Hohenbrink, Jr.
(74) *Attorney, Agent, or Firm* — Lucas & Mercanti, LLP; Klaus P. Stoffel (57) ABSTRACT

Method for producing tilled containers from parisons made from a thermoplastic material, wherein the respective parison is at least conditioned thermally and is subsequently shaped during a shaping and filling phase in a mold by the action of the pressure of the supplied filling substance into the respective container at a shaping and filling pressure, wherein, during the shaping and filling phase, the parison is guided at least temporarily through a stretching rod and/or is stretched in the axial direction, and wherein, at least at the end of the shaping and tilling phase, the respective container has an internal pressure which corresponds to the shaping and filling pressure (p2).

23 Claims, 6 Drawing Sheets (30) Foreign Application Priority Data

| Feb. 11, 2011 | (DE) | 10 2011 011 076 |
| Feb. 28, 2011 | (DE) | 10 2011 012 664 |
| Feb. 28, 2011 | (DE) | 10 2011 012 665 |

(51) Int. Cl.
| *B29C 49/46* | (2006.01) |
| *B29D 22/00* | (2006.01) |
| *B29C 49/12* | (2006.01) |
| *B65B 3/22* | (2006.01) |
| *B29C 49/06* | (2006.01) |
| *B29C 49/36* | (2006.01) |
| *B67B 3/20* | (2006.01) |
| *B29C 49/58* | (2006.01) |
| *B29C 49/60* | (2006.01) |

(52) U.S. Cl.
CPC .............. *B65B 3/022* (2013.01); *B29C 49/06* (2013.01); *B29C 49/12* (2013.01); *B29C 49/36* (2013.01); *B29C 2049/1228* (2013.01); *B29C 2049/465* (2013.01); *B29C 2049/4626* (2013.01); *B29C 2049/4664* (2013.01); *B29C 2049/5841* (2013.01); *B29C 2049/6018* (2013.01); *B65B 3/22* (2013.01); *B67B 3/20* (2013.01)

(58) Field of Classification Search
USPC ........... 53/574, 452, 453; 264/454, 523, 573
See application file for complete search history.

(56) References Cited

U.S. PATENT DOCUMENTS

| 5,016,684 | A | * | 5/1991 | Clusserath | ................ B67C 3/12 |
| | | | | | 141/39 |
| 5,346,386 | A | | 9/1994 | Albrecht et al. | |
| 5,648,026 | A | | 7/1997 | Weiss | |
| 6,485,670 | B1 | | 11/2002 | Boyd | |
| 7,914,726 | B2 | | 3/2011 | Andison et al. | |
| 9,498,913 | B2 | | 11/2016 | Haesendonckx | |
| 2002/0048642 | A1 | | 4/2002 | Beck | |
| 2005/0206045 | A1 | | 9/2005 | Desanaux | |
| 2009/0218733 | A1 | * | 9/2009 | Andison | ................ B29C 49/46 |
| | | | | | 264/525 |
| 2011/0061343 | A1 | * | 3/2011 | Roithmeier | ............ B29C 49/42 |
| | | | | | 53/452 |
| 2011/0268855 | A1 | | 11/2011 | Chauvin et al. | |
| 2012/0266567 | A1 | | 10/2012 | Haesendonckx et al. | |

FOREIGN PATENT DOCUMENTS

| DE | 102010007541 A1 | 6/2011 | |
| EP | 0331137 Y | 9/1989 | |
| EP | 0375912 A | 7/1990 | |
| GB | 2431372 A | 4/2007 | |
| IT | EP 0375912 A1 * | 7/1990 | ............... B65B 3/04 |
| JP | 2000043129 Y | 2/2000 | |
| WO | 9630190 A1 | 10/1996 | |
| WO | 2007120807 Y | 10/2007 | |
| WO | 2009075791 A1 | 6/2009 | |
| WO | 2010003853 Y | 1/2010 | |
| WO | 2011076167 | 6/2011 | |

* cited by examiner

METHOD AND DEVICE FOR PRODUCING CONTAINERS WHICH ARE FILLED WITH A LIQUID FILLING SUBSTANCE

The present application is a 371 of International application PCT/EP2012/000163, filed Jan. 17, 2012, which claims priority of DE 10 2011 009 888.7, filed Jan. 31, 2011, DE 10 2011 009 889.5, filed Jan. 31, 2011, DE 10 2011 011 076.3, filed Feb. 11, 2011, DE 10 2011 012 664.3, filed Feb. 28, 2011, and DE 10 2011 012 665.1, filed Feb. 28, 2011, the priority of these applications is hereby claimed and these applications are incorporated herein by reference.

BACKGROUND OF THE INVENTION

The manufacture of containers by blow molding from preforms made of a thermoplastic material, for example from preforms made of PET (polyethyleneterephthalate), is known, wherein the preforms are supplied to different machining stations inside a blow-molding machine (DE-OS 43 40 291). Typically, a blow-molding machine has a heating device for the tempering or pre-heating (thermal conditioning) of the preforms and a blow-molding installation with at least one blow-molding station, in the area of which the in each case previously tempered preform is expanded biaxially or multiaxially into a container. The expansion occurs with the help of a compressed gas (compressed air) as the pressure medium which is introduced in the preform to be expanded by means of a shaping pressure. The process-engineering procedure for a preform expansion such as this is explained in DE-OS 43 40 291.

The basic structure of the blow-molding station is described in DE-OS 42 12 583. Options for tempering the preforms are explained in DE-OS 23 52 926.

According to a typical further processing method, the containers made by blow-molding are supplied to a subsequent filling installation and are filled here with the planned product or filling substance. Thus, a separate blow-molding machine and a separate filling machine are used. Also known, furthermore, is combining the separate blow-molding machine and the separate filling machine to form one machine block, i.e. to form a blocked blow-molding and filling installation, wherein moreover the blow-molding and the filling take place on separate machine components and chronologically consecutively.

It has furthermore already been proposed to produce containers, in particular also in the form of bottles made of thermally conditioned or pre-heated preforms and moreover at the same time to fill them with a liquid filling substance, which is supplied as a hydraulic pressure medium to expand the preform and to shape the container with a shaping and filling pressure, so that the particular preform is shaped into the container at the same time as the filling. Certain problems with methods of this kind are that the contamination of the particular shaping and filling station or the mold made by this station, which is made similarly to a blow-mold of a blow-molding machine to produce containers made of thermally conditioned preforms by blowing with a compressed gas, must be avoided. Especially in the case of a full or partial carbonation of the filling substance, there is to a particular degree the danger of a contamination of the particular shaping and filling station by filling substance losses, in particular at the lowering of the internal pressure of the container, i.e. when depressurising the container from the very high shaping and filling pressure to the ambient pressure. Filling substance losses of this kind are caused in particular by a massive formation of foam at depressurisation, so that the simultaneous shaping and filling of containers could hitherto not be used where preforms were used and where the filling substance was used as a pressure medium (hydraulic shaping technology), in particular for products containing $CO_2$.

SUMMARY OF THE INVENTION

It is the task of the invention to disclose a method which avoids the aforesaid drawbacks and avoids, in the hydraulic shaping technique, the danger of contamination of the particular shaping and filling station even where the filling substance contains $CO_2$.

In the invention, the depressurization of the filled containers from the high shaping and filling pressure (e.g. in the range of 8 bar to 15 bar) to the atmospheric or ambient pressure takes place in at least two stages, this being initially in at least one pre-depressurization phase to a pre-depressurisation pressure which is clearly less than the shaping and filling pressure, and then chronologically consecutively in at least one residual depressurization phase to the atmospheric or ambient pressure. This staged depressurizing avoids, even with a filling substance with a high $CO_2$ content, a formation of foam causing a product loss and thus a contamination of the particular shaping and filling station.

In the meaning of the invention, the expression "substantially" or "approximately" means deviations from exact values in each case by +/−10%, and preferably by +/−5% and/or deviations in the form of changes not significant for the function.

Further developments, benefits and application possibilities of the invention arise also from the following description of examples of embodiments and from the figures. In this regard, all characteristics described and/or illustrated individually or in any combination are categorically the subject of the invention, regardless of their inclusion in the claims or reference to them. The content of the claims is also an integral part of the description.

The invention is explained in more detail below by means of the figures using examples of embodiments. The following are shown.

BRIEF DESCRIPTION OF THE DRAWING

DETAILED DESCRIPTION OF THE INVENTION

Figure 1:
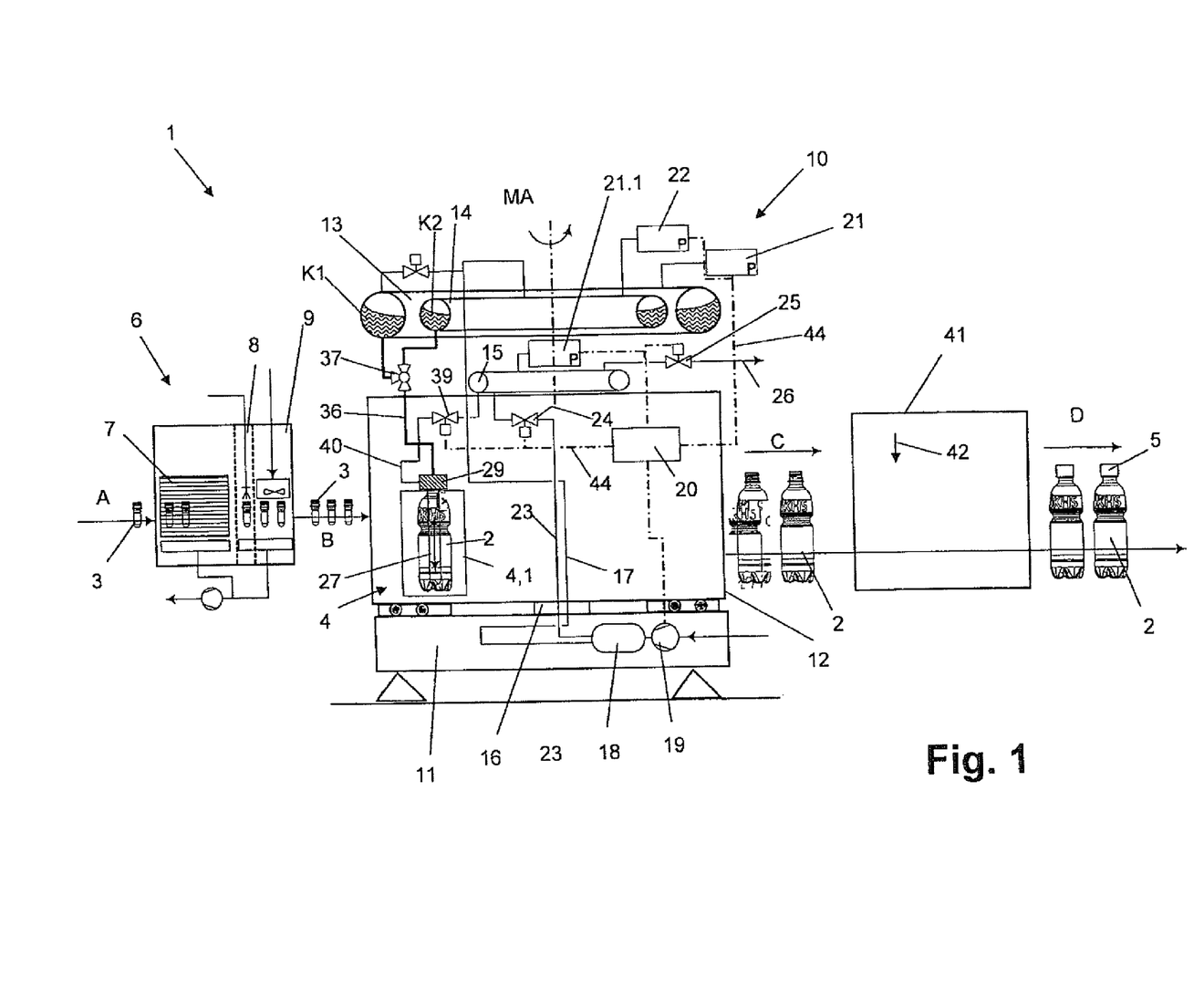
FIG. 1 in a schematic representation, an installation according to the invention for the production of filled and sealed containers.

The installation generally designated by 1 in FIG. 1 serves for the production of filled and sealed containers 2 in the form of bottles using preforms 3 made of a thermoplastic material, for example polyethyleneterephthalate (PET), polyethylene (PEE), polyethylene naphthalate (PEN) or polypropylene (PP). The preforms 3 are designed sleeve-like with one open end 3.1 forming the subsequent container mouth 2.1, with a closed base 3.2 forming the subsequent container base 2.2. and with a flange 3.3 forming the subsequent mouth flange 2.3.

The production of the containers 2, filled with a liquid filling substance and sealed, is carried out basically such that the in each case conditioned, i.e. pre-heated preform 3 disposed in a closed mold 4.1 of a shaping and filling station is impacted with the filling substance which is under a high shaping and filling pressure and is shaped by this filling substance hydraulically into the particular container 2. The container 2, shaped and simultaneously filled in this way, is then after its depressurization to ambient pressure tightly sealed, i.e. its container mouth 2.1 is provided with a sealing element 5, for example with a cap-type sealing element.

To carry out this method, the installation 1 contains inter alia an installation 6 to which the preforms 3 are supplied by means of a conveyor, which is not illustrated, according to arrow A and which provides at an outlet, the conditioned preforms 3, i.e. the preforms 3 pre-heated at least to glass transition temperature. The embodiment illustrated shows an advantageous further development, wherein at the same time sterilized and dried preforms 3 from the mold 4.1 can also be fed to a shaping and filling station 4. The installation 6 has a heating section 7 for this in which the preheating of the preforms takes place, for example by IR emitter, NIR emitter or by microwave etc. Moreover, in a further section 8 of the installation 6, impact or mist-type spraying of the heated preforms 3 with a sterilization medium occurs, for example with a sterilization medium which is heated and/or in vapor form, containing hydrogen peroxide or with peracetic acid or with an antimicrobial gas. In a further section 9 of the installation 6, then, using hot sterile air, the activation of the sterilization medium and the drying of the conditioned and sterilized preforms 3 takes place. These are then fed to a preform inlet of a shaping and filling machine 10 by means of a transport section, which is not illustrated, according to arrow B. Not shown is a variant in which, instead of the aforesaid damp sterilization, sterilization by means of radiation takes place, in particular by means of UV radiation, pulsed UV radiation, electron radiation (e-beam) or another suitable emitter.

The shaping and filling machine 10 includes inter alia a rotor 12, mounted in a swiveling manner on a machine rack 11 and which can be driven around a vertical machine axis MA, said rotor being indicated in the schematic diagram of FIG. 1 as a block. On the rotor 12, distributed at regular angular distances around the machine axis and at an identical radial distance from this machine axis, a number of shaping and filling stations 4 each with a mold 4.1 is provided. Moreover, in the embodiment illustrated, on the rotor 12 three annular vessels 13-15 in each case concentrically enclosing the machine axis MA are provided, of which during operation of the shaping and filling machine 10 the external annular vessel 12 having the greatest volume is filled with the first component K1, under a filling and shaping pressure p2, of the liquid filling substance and the annular vessel 14, enclosed by the annular vessel 13, with the smaller volume is filled with the second component K2, likewise under the filling and shaping pressure p2, of the filling substance. The empty annual vessel 15, in the representation of FIG. 1, arranged under the annular vessels 13 and 14 and serving as a depressurizing channel, contains an inert gas, e.g. CO2 gas and is subjected to the depressurization pressure p1.

The vessels 13 and 14 are in each case generally only partially filled with the components K1 and K2 so that in the annular vessels 13 and 14 in each case a lower liquid space and above it a gas space is formed which is filled with an inert gas under the filling and shaping pressure p2, for example CO2 gas or nitrogen, which is supplied from an inert gas holding tank 18, housed in the machine rack 11 and preferably cooled, by means of an inert gas connector 17 with a rotary union 16. The inert gas is fed to the holding tank 18 from an inert gas source, which is not illustrated, by means of a compressor 19, this being in such a way that in the inert gas holding tank 18 and thus also in the gas spaces of the annular vessels 13 and 14, the filling and shaping pressure p2 is maintained at the necessary level and is kept constant. The control of the compressor 19 needed for this is carried out by means of a control installation 20 depending on pressure sensors 21 and 22, which capture the pressure in the annular vessels 13 and 14, wherein the control installation 20 is connected to the relevant sensors and also control and adjustment units by means of data lines and/or wireless data connections 44. The filling level in the vessels 13 and 14 is kept constant by level adjustment or control.

To maintain a constant pre-depressurization pressure p1 in the annular vessel 15, the latter is connected likewise to the inert gas holding tank 18 by means of a further inert gas connection 23, including the rotary union 16. A control valve 24 is provided in the inert gas connection 23. A further control valve 25 is in a ventilation line 26 of the annular vessel 15. Both control valves are controlled by the control unit 20 depending on a pressure sensor 27 which captures the internal pressure of the annular vessel 15, such that in the annular vessel 15 an inert gas pressure matching the pre-depressurization pressure p1 constantly prevails.

The annular vessels 13, 14 and 15 are of course provided jointly for all molds 4.1 or for all the shaping and filling positions, formed by these molds, of the shaping and filling machine 10.

Figure 2:
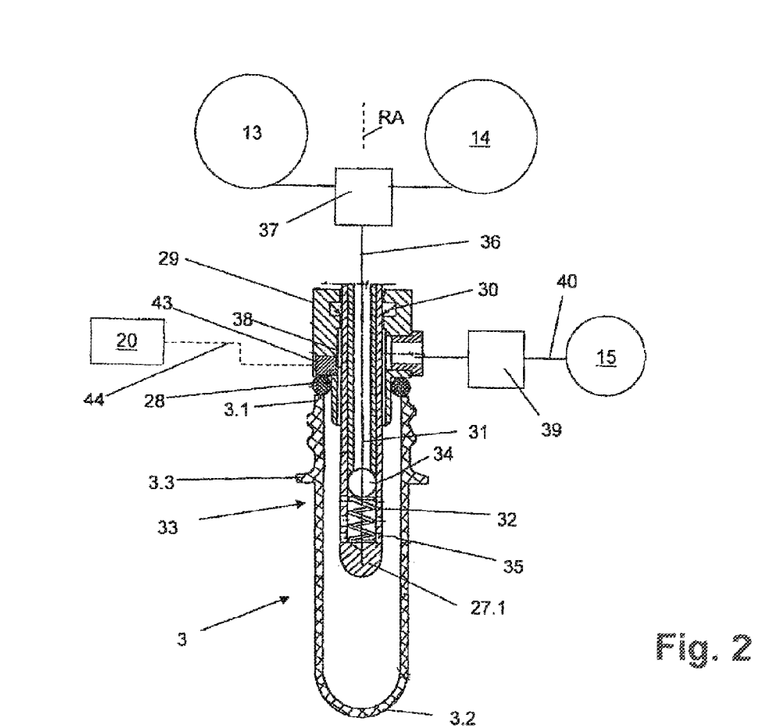
FIG. 2 in a simplified detailed drawing and in cross-section, a preform together with a part, having a stretching rod, of a shaping and filling station of a shaping and filling machine of the installation of FIG. 1.

In its interior or in its mold chamber, each mold 4.1 is formed inter alia with a stretching rod 27 which is oriented with its longitudinal side or axis RA parallel to the vertical machine axis MA and can be moved axially by a drive, not illustrated, e.g. a control cam, synchronously with the rotational movement of the rotor 12, so that, when the particular container 2 is molded from the conditioned preform 3, the stretching rod 27 extending into this preform has its lower rounded end 27.1 shown in FIG. 2 lying against the base 3.1, stabilizes the latter in this way and, with the help of the filling substance introduced into the preform 3 by means of the stretching rod 27, at the filling and shaping pressure p2 increasingly extends into the container, the outer shaping of which is then formed by the inner surface of the mold 4.1.

As FIG. 2 shows, the particular preform 3 is, inside the mold 4.1, tight on a bearing head 29, i.e. its open end 3.1 forming the subsequent container opening 2.1, lies sealed against the bearing head 29 by means of a seal 28, whereby the stretching rod 27 is routed axially sealed with an annular seal 30 in said bearing head 29.

Figure 3:
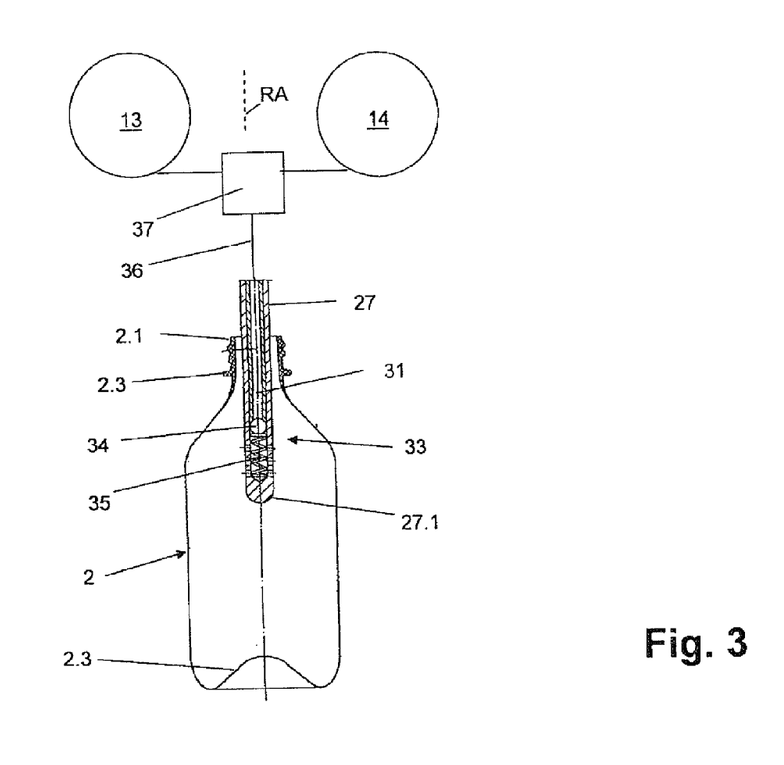
FIG. 3 a similar representation as FIG. 2, but with the fully formed container in the form of a bottle.

In the embodiment variant shown, a channel 31 is formed in the stretching rod 27 on the same axis as the axis RA, said channel having above the end 27.1 a multiplicity of radial outlet openings 32 and in said channel before the outlet openings a check valve 33 with a ball 34 and pressure spring 35 is provided. The channel 31 continues at its end lying away from the outlet openings in a liquid connection 36 which inter alia contains at least one stop and switching valve 37 by means of which the channel 31 can be connected as selected to the liquid space of the annular vessel 13 or of the annular vessel 14 and with which furthermore the connection to both annular vessels 13 and 14 can be interrupted (see to FIG. 3).

In the bearing head 29, which encloses the stretching rod 27 in a ring shape, a return gas channel 38 is formed which likewise opens into the inner chamber of the preform 3 disposed tight on the bearing head 29 or in the inner chamber of the container tight on the bearing head 29. The return gas channel 38 is connected to the annular vessel 15 by means of a return gas line which has a control valve 39. The liquid connection 36 with its stop and switching valve 37 controlled for example by the control installation 20 and the return gas line 40 with its control valve 39 likewise controlled by the control installation 20 are provided such that they can be controlled separately and individually for each shaping and filling station 4.

For example, when filling the containers 2 with a filling substance containing $CO_2$, both components K1 and K2 are identical with regard to the filling substance and differ solely in that the component K1 contains a smaller proportion of $CO_2$ than the component K2, wherein during the shaping and filling of the containers 2, the components K1 and K2 are dosed such that the filling substance, introduced into the particular container 2, made from the components K1 and K2 have the required $CO_2$ content. In this regard, there is also in particular the possibility of supplying the component K2 at a temperature which is lower than the temperature of the component K1, for example at a temperature approximately 10° lower than the component K1. The temperature of the component K1 corresponds for example to the ambient temperature or is slightly higher than the ambient temperature. The introduction of the components during the shaping and filling of the containers 2 occurs preferably chronologically consecutively, and indeed firstly the component K1 and then directly before the final shaping or after the final shaping of the particular container as a sublayer the component K2. Depending on the product, desired $CO_2$ saturation level and product temperature, it is sufficient to provide only a single annular vessel (13).

The most diverse methods are possible with the shaping and filling machine 10, whereby common to all methods is that during filling with the supplied filling substance at the shaping and filling pressure p2, the final shaping of the particular container 2 from the conditioned preform 3 in the corresponding mold 4.1 takes place.

Shaping and filling of the containers with a carbonated filling substance or filling substance containing $CO_2$. After inserting the particular conditioned preform 3 in a mold 4.1 and after closing the mold 4.1, by the corresponding control of the associated stop and switching valve 37, for example in a specified rotational position of the rotor 12 and/or cam-controlled, the introduction of the filling substance by means of the stretching rod 27 or by means of the outlet openings 32 into the preform 3, which lies with a bracket which engages behind the mouth flange 3.3 with its opening 3.1 pressed tight against the annular seal 28. The filling substance fed to the preform 3 has the shaping and filling pressure p2 which is for example in the range from 8 to 15 bar. With increasing distortion or expansion of the blank 3, to stretch it, the stretching rod 27 the end 27.1 of which lies against the inner surface of the base 3.2 is moved axially downwards, i.e. moved increasingly outwards from the bearing head 29, namely as the filling substance continuously flows into the blank 3.

If the shaping and filling of the particular container 2 occurs using the two components K1 and K2, then during the shaping and filling process initially only the component K1 containing no or only a small amount of $CO_2$ is moved from the annular vessel 13 into the preform 3 or into the container 2 being formed and then by the corresponding switching of the stop and switching valve 37 with a time delay the component K2 containing the higher proportion of $CO_2$ is introduced into the container 2 being formed, e.g. the component K2 just before the final filling and shaping of the particular container 2. This sequence is then in particular expedient where the component K2 containing the higher proportion of $CO_2$ is at a higher pressure than the component K1 containing the smaller proportion of $CO_2$. The introduction of the component K2 ideally takes place by means of the outlet openings 32 which are furthermore close to the base 2.2. of the container 2 being formed so that the second component K2 is introduced as a sublayer into the filling substance, already in the container 2, of component K1, which helps to avoid the formation of foam in a positive way during the depressurization. The switching of the stop and switching valve 37 from the component K1 to the component K2 occurs for example under time or cam control. Following the complete shaping and filling of the container 2, the liquid connection 36 is blocked by closing the stop and switching valve 37 so that then, possibly after a settling phase initiated following the closure of the stop and switching valve, the shaping and filling phase has ended. The containers 2 are then filled with a specified volume of the liquid filling substance such that, by means of the filling substance level, a headspace filled with air or a gas still remains in the container 2.

After the end of the shaping and filling phase, there is an at least one-stage pre-depressurizing of the container 2 to a pre-depressurization pressure p1 still lying above the ambient pressure p0, for example to a pre-depressurization pressure p1 in the range of 1.5 to 2.5 bar. Only following a further settling phase does the final depressurizing to the ambient pressure p0 occur in at least one residual depressurization phase, as is described below in detail.

At least during the pre-depressurization, the filled container 2 with its container mouth 2.1 is still held tight against the bearing head 29 by means of the annular seal 28. The at least one-stage pre-depressurization occurs by controlled opening of the control valve 39 so that, by means of the return gas channel 38 and the return gas line 40 with the opened control valve 39, the at least one-stage pre-depressurization can take place in a controlled manner in the annular vessel 15. Furthermore, to achieve a reproducible pressure course and to control the pressure course during the pre-depressurization in the return gas line 40 at least one metering valve defining a specified flow section or a comparable device is provided.

The volume of the annular vessel 15 is selected to be sufficiently large so that at the pre-depressurizing of the containers in different shaping and filling positions pressure fluctuations in the annular vessel 15 do not occur or substantially do not occur. In addition to this, a pressure sensor 21.1 and two control valves 24, 25 are provided to adjust or to ensure the isobar or almost isobar status in the vessel interior.

The residual depressurization occurs by removing the tight positioning between the container 2 and the bearing head 29, for example by lowering the container 2 by means of the annular gap then existing between the annular seal 28 and the container mouth 2.1, and indeed for example with the mold 4.1 open. At least after the residual depressurization, the stretching rod 27 is moved back to a starting position in which it projects only slightly above the side, having the annular seal 28, of the bearing head 29 or however is completely inserted in the bearing head 29 so that the relevant mold 4.1 is then in a condition to take a further preform 3.

During the settling phase following the pre-depressurizing, the control valve 39 for example is opened and is closed only after the end of the settling phase and before the start of the residual depressurizing. The length of the settling phase, i.e. for example the closing of the control valve 39 at the end of the settling phase, occurs for example under time control and/or depending on the rotational position of the rotor, for example by at least one electrical sensor capturing the particular rotational position.

The filled container 2 is taken from the bearing head 29 on a container outlet of the shaping and filling machine 10 and is fed by means of a conveyor, which is not illustrated, according to arrow C to an installation 41 for sealing the containers 2 with the seals 5.

Shaping and filling of the containers with a still or CO2-free filling substance: The shaping and filling phase takes place for example as is described above for the shaping and filling of containers with a carbonated filling substance, but with the difference that during the shaping and filling phase a still, i.e. CO-free, filling substance is introduced into the relevant preform 3. A settling phase at the shaping and filling pressure p2 is not necessary.

After the end of the shaping and filling phase, an at least two-stage pre-depressurizing of the relevant container, for example by a corresponding control of the control valve 39, this being initially to a partial depressurizing or carbonation pressure p1.1, p1.2, which is still clearly above the pre-depressurization pressure p1, for example less than 6 bar. With this partial depressurizing or carbonation pressure p1.1, then with the container 2 arranged tight on the bearing head 29, the flushing of the container interior with pure CO2 gas (carbon dioxide or H2CO3) takes place. This flushing is for example likewise carried out by means of channel 31 in the stretching rod 27, this being with the additional benefit that the flushing of the filling substance found in the container 2 occurs as a sublayer by means of the stretching rod 27, the end 27.1 of which is close to the container base 2.2 and moreover residual filling substance also in the channel 31 during flushing with the CO2 gas is removed or at least extensively removed, which additionally helps avoid the subsequent dripping of the filling substance where the particular filled container 2 is removed from the bearing head 29.

The filled container 2 is then taken from the bearing head 29 on a container outlet of the shaping and filling machine 10 and is fed by means of a conveyor, which is not illustrated, according to arrow C to an installation 41 for sealing the containers 2 with the seals 5.

The partial depressurizing or carbonation pressure p1.1, p1.2 is preferably selected depending on the temperature and foaming reaction of the particular filling substance, i.e. one or more pressure stages shrink with rising temperature of the filling substance.

After the carbonation phase, which for example also includes a settling phase, which is initiated after the end of the flushing and in which the internal pressure of the container 2 is held at the partial depressurizing or carbonation pressure p1.2, a further pre-depressurizing to the pre-depressurization pressure p1 then takes place. In this method, the latter lies preferably in the range between 0.3 bar and 0.7 bar, particularly preferably 0.5 bar above the atmospheric or ambient pressure. I.e. the pre-depressurizing pressure p1 generally stands at 1.3 bar to 1.7, preferably approx. 1.5 bar.

At the end of the settling phase following the pre-depressurizing, whereby during said settling phase the container 2 is then held at the pre-depressurization pressure p1, in at least one residual depressurization phase the residual depressurizing to ambient pressure and then the removal of the filled container 2 from the opened mold 4.1 or from the relevant shaping and filling station 4 takes place.

The sealed containers 2 are moved according to arrow C to a further component of the installation 1. The conveyors for transporting the preforms 3 and the containers 2 are made in the usual way known to the person skilled in the art, this being preferably a suspended transportation of the preforms 3 and the containers 2.

In particular it is possible to produce containers 2 filled with this machine, said containers being filled with a carbonated or still, i.e. CO2-free, mixed product as the filling substance, for example consisting of the two components K1 and K2, of which the component K1 is a base component, for example carbonated water, and component K2 an additional component, for example a flavoring component, and the mixing of both components occurring only when the containers 2 are being shaped and filled.

Above, it is assumed that the filling and shaping phase is carried out under time control and/or controlled by the rotational or angular position of the rotor 12, this being on the assumption that in a particular time span and/or at a particular angular position of the rotor 12, the particular container 2 is completely shaped and thus also filled with the necessary volume. Basically however, there is also the possibility of capturing the inflowing filling substance during the particular shaping and filling phase and controlling the duration of the particular shaping and filling phase by means of the electrical measuring signals of these installations.

Above it is further assumed that the pre-depressurizing to pre-depressurization pressure and the settling phase following this pre-depressurizing is time-controlled and/or controlled by the angular position of the rotor. Basically, there is also the possibility of controlling the duration of the pre-depressurizing and/or the settling phase following the pre-depressurizing depending on the pressure sensors which capture the internal pressure of the shaped and filled containers at the shaping and filling positions.

Combinations of time and sensor control of the course of the method are also possible, for example in a form whereby in each case only at one or however at two shaping and filling stations, preferably at two shaping and filling stations offset from each other by 180° around the machine axis MA, by means of sensors there, the supplied filling substance quantity and/or the internal pressure of the container are captured and the time control for all shaping and filling stations is set and/or corrected with the sensor signals thereby generated. A particularly advantageous method and device variant is indicated in FIG. 2 and consists of the provision in the bearing head 29 of a sensor unit 43 for the monitoring of the headspace or of the filling substance, which is connected to the control element 20 by means of data lines and/or connections. This sensor unit 43 includes for example a pulse and/or vibration emitter, for example an ultra-sound emitter, and a corresponding sensor element, in particular a sound and vibration sensor, such as for example a piezo sensor.

During the filling and shaping, the vibration characteristics of the gas and/or liquid volume and/or preform or container wall is captured and analyzed, whereby the ACTUAL vibration characteristics are compared with expected TARGET vibration characteristics which was taught in to an appropriate analysis and control unit. If a container 2 should now leak or burst during the filling and shaping process or if during one of the depressurisation stages an inadmissibly large quantity of foam should form, this is captured by the sensor element 43 and used for the control of the current and/or subsequent stages of the method. If during a process for which a two-stage depressurization is provided according to the graph in FIG. 4, in the pre-depressurization phase II, an excessive amount of foam forms in the headspace of the container 2, then there can be a switch for example automatically to a two-stage pre-depressurization phase II in which the control valve 39 is briefly closed once more. A critical foaming of this kind could also be countered by changing the pressure development characteristics in the pre-depressurization phase II, for example by an adapted relaxation time, i.e. a flatter gradient and/or by automatically selecting a higher pre-depressurization pressure p1.

If a very sensitive sensor is selected, for example a piezo sensor which is directly or indirectly in contact with the preform 3 or the container 2 for example by means of a mechanical coupling, it may be sufficient for the sensor unit 20 not to include any additional sound and/or vibration emitter, and for the capture and analysis of the characteristic natural vibration and/or resonance reaction or the deviation from it to be sufficient to achieve the aforesaid method management.

There is moreover the possibility of purging the inner chamber of the particular preform 3 before the start of the shaping and filling phase with an inert gas, for example with CO2 gas or nitrogen, e.g. with the CO2 gas from the annular vessel 15. This purging can then be carried out for example by the controlled brief opening of the control valve 39 by means of the return gas line 40 and the return gas channel 38, whereby the preform 3 is not yet tight on the seal 28 of the bearing head 29 so that the air in the preform 3 is blown out with the inert gas used for purging through the annular gap between the annular seal 28 and the opening 3.1. In this regard, it may also be expedient first to dry the inert gas or CO2 gas used for purging and taken from the annular vessel 15. By purging the preforms 3 with inert gas before the introduction of the shaping and filling phase, there is the possibility of connecting the headspace of the preform 3 or the container 2 arising during the shaping and filling phase to the gas space of the annular vessel 13 and/or 14, this being to return any gas volume which may be forced out of the preform 3 or out of the arising container 2 during the shaping and filling.

Furthermore, it can be expedient to pre-stretch the preform 3 found tight on the bearing head 29 before the introduction of the liquid filling substance with an inert gas at shaping and filling pressure p2, e.g. with CO2 gas or with a gas containing CO2. In this way, at the introduction of the filling substance under shaping and filling pressure, pressure surges can be avoided which may disrupt the method and/or the correct shaping of the containers 2. Where there is no pre-stretching with an inert gas, pressure surges of this kind can occur due to, upon introducing a carbonated filling substance into the non-pre-stretched preform 3, CO2 gas emerging from the filling substance outlet and then being dissolved back into the filling substance as the pressure rises.

It is known that the unmixing reaction and the foaming are to a large extent dependent on the temperature of the liquid. In the food industry, it is in many instances the case that the product to be filled is stored for a time in tanks which are not cooled, or comes directly from production at different temperatures. Thus, a particularly advantageous method variant lies in controlling the entire depressurization phase, comprising the at least one-stage pre-depressurizing, the subsequent settling phase and the residual depressurizing then following, depending on the temperature of the filling substance. This means that the temperature is captured by sensors in the at least one filling substance vessel and the entire duration of the depressurization phase controlled, but in particular the duration and/or the course of the individual phases and/or the pressure of the pre-depressurization or an additional partial depressurization depending on the temperature of the filling substance. This occurs for example such that with an increasing temperature of the filling substance, the duration of the depressurization phase and/or its partial phase and thus the performance of installation 1 are overall extended steplessly, this being by capturing the filling substance temperature in the annular vessels 13 and 14 and by a corresponding control of the shaping and filling machine 10 by means of the control installation 20. With small temperature fluctuations, a minor change in the rest phase is sufficient, while in the event of a stepped or stepless control of this kind, appropriate action must of course be taken on all adjacent units. In the event of an improved device or an optimized method, upstream of the filling points, a cooling system is provided which ensures process stability in the event of a critical product temperature being overstepped by cooling at least parts of the filling medium.

Vice versa, a very cold product, for example in cold regions or due to the season, allows a shorter rest phase or the switch from a two-stage pre-depressurization to a one-stage pre-depressurization.

Regardless of the special method, the depressurization of the particular container from the very high shaping and filling pressure p2 (for example in the range of 8 bar to 15 bar, in some cases even of over 20 bar) to around ambient pressure p0 is problematic. In particular, with this depressurization, even with a filling substance containing CO2, a contamination of the molds 4.1 by an excessively foaming and/or splashed filling substance must be avoided. For this reason, an optimum design of the depressurization or its partial phases is indispensable.

Figure 4:
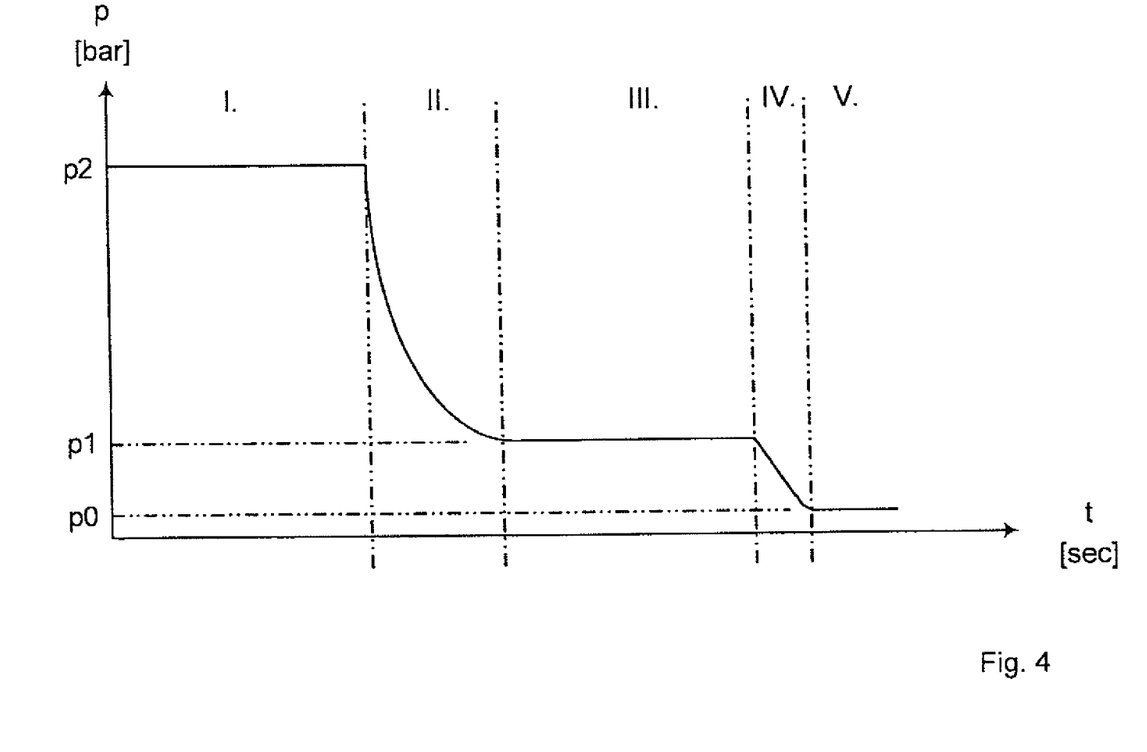
FIGS. 4 and 5 in each case in a graph showing the chronological pressure development of the internal pressure of the container during the shaping and filling phase and during the subsequent depressurizing of the container to ambient pressure.

FIG. 4 shows in a graph the course of the internal pressure of the particular container 2 during the shaping and filling phase and the subsequent depressurization phase depending on the time t. During the filling and shaping phase, which is identified in the graph by time section I, the internal pressure of the particular container is constant or substantially constant and corresponds to the shaping and filling pressure p2 (for example in the range of 8 bar to 15 bar). As explained, after the end of the filling substance flow (by closing the stop and switching valve 37), the shaping and filling phase I can include a pre-settling phase the duration of which is for example 0.2 to 5 seconds.

The shaping and filling phase I is followed, in the method reproduced in FIG. 4, by a pre-depressurization phase II, the duration of which is for example at least 0.1 seconds and at most 1 second and which is formed such that the internal pressure of the container 2 is lowered during this pre-depressurization phase II to the pre-depressurization pressure p1 or is asymptotically approximately this pre-depressurization pressure p1, which lies for example in the range of 1.2 bar to 2.5 bar, being for example for the shaping and filling of the containers 2 with an already carbonated filling substance in the range of 1.4 bar to 2.3 bar and for the shaping and layered filling of the containers 2, for example with an initially CO2-free filling substance with subsequent carbonation in the range of 1.3 bar to 1.7 bar and moreover preferably 1.4 to 1.6 bar.

The duration of the pre-depressurization phase II is at least 0.1 seconds and at most 1 second; the duration of the pre-depressurization phase II is preferably in the range of 0.2 to 0.4 seconds.

The pre-depressurization phase II is followed by a settling phase III in which the internal pressure of the container 2 is kept constant or mainly constant at the pre-depressurization pressure p1. In this phase, small gas bubbles rise from the CO2 being released in the filling substance, said bubbles being carried off into the annular vessel 15 at isobar internal pressure. The duration of the settling phase III is for example at least 0.5 seconds and at most around 2 seconds; the duration of the settling phase III is preferably in the range of 0.6 to 1 second. Following the settling phase III, a depressurization to the ambient pressure p0 or to a residual pressure slightly above the ambient pressure p0 occurs in a residual depressurization phase IV. It has proved surprisingly that the bubbles and small bubbles lying very high in the bottle after the settling phase, in particular directly underneath the liquid level in the bottle or in the container, no longer or almost no longer tend to foaming.

The residual depressurization phase IV has a relatively steep pressure drop and has a duration of at least 0.05 seconds and at most 0.5 seconds. The duration of the residual depressurization phase IV preferably lies in the range of 0.08 to 0.15 seconds. At the end of the residual depressurization phase IV, the particular container 2 is completely depressurized to the ambient pressure p0 (in this regard see graph section V in FIG. 4).

Figure 5:
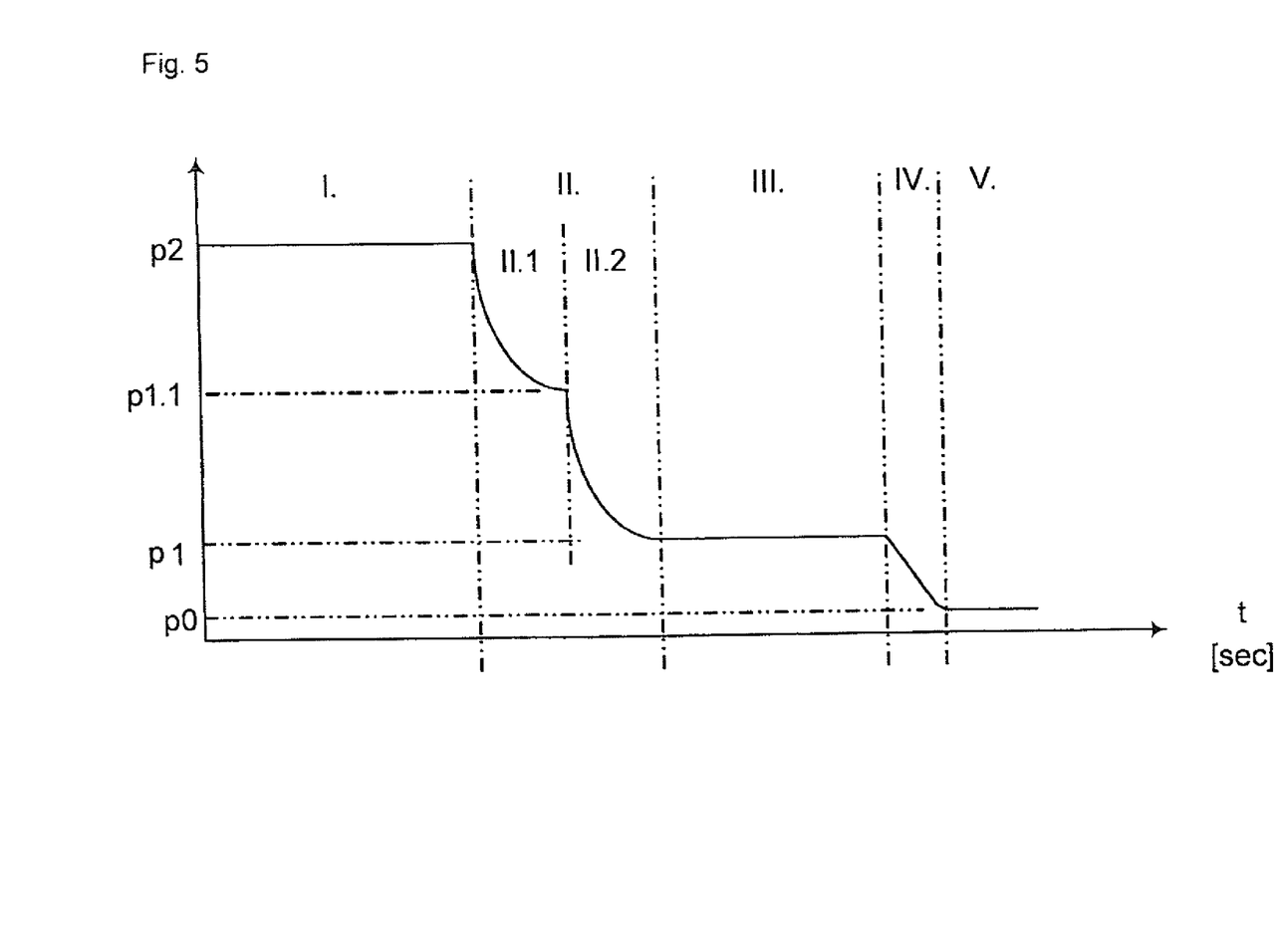

FIG. 5 shows in a graph the chronological dependence of the internal pressure of the container 2 during the shaping and filling phase I, the pre-depressurization phase II, the settling phase III, the residual depressurization phase IV and after depressurizing to the ambient pressure (graph section V). The method illustrated in FIG. 5 differs from the method in FIG. 4 substantially only in that the pre-depressurization is carried out in stages so the pre-depressurization phase II has two partial phases II.1 and II.2. During the pre-depressurization, the particular container 2, after the end of the shaping and filling phase I, is first depressurized to a partial depressurization pressure p1.1 and then in a further partial phase II.2 finally to the pre-depressurization pressure p1. The pre-depressurizing to partial depressurization pressure p1.1 occurs for example by the brief opening and closing of the control valve 39, preferably taking into account a metering valve provided in the gas channel 40 for this partial depressurization. The opening and closing of the valve effecting the partial depressurization, for example of the control valve 39, occurs under time control and/or on the basis of the measuring signals supplied by the sensors capturing the internal pressure of containers 2. Basically, moreover once again there is the possibility of a combination of the time and sensor control in such a way that pressure sensors are provided on one shaping or filling station or on two stations of this kind, and that the time control is set and/or corrected for the partial phases II.1 and/or II.2 depending on the measuring signal of these pressure sensors for all shaping and filling stations. Basically there is also still the possibility of providing, in addition to the annular vessel 15 on the rotor 12, a further annular vessel which is filled with an inert or CO2 gas at the partial depressurization pressure p1.1 so that the partial depressurization can then take place in this additional annular vessel. The partial depressurization pressure p1.1 is already clearly below the shaping and filling pressure p2 but sufficiently above the depressurization pressure p1. The difference between the partial depressurization pressure p1.1 and the pre-depressurization pressure p1 corresponds for example at most to half the difference between the shaping and filling pressure p2 and the pre-depressurization pressure p1:

$$(p1.1-p1) \leq 1/2 \times (p2-p1).$$

Figure 6:
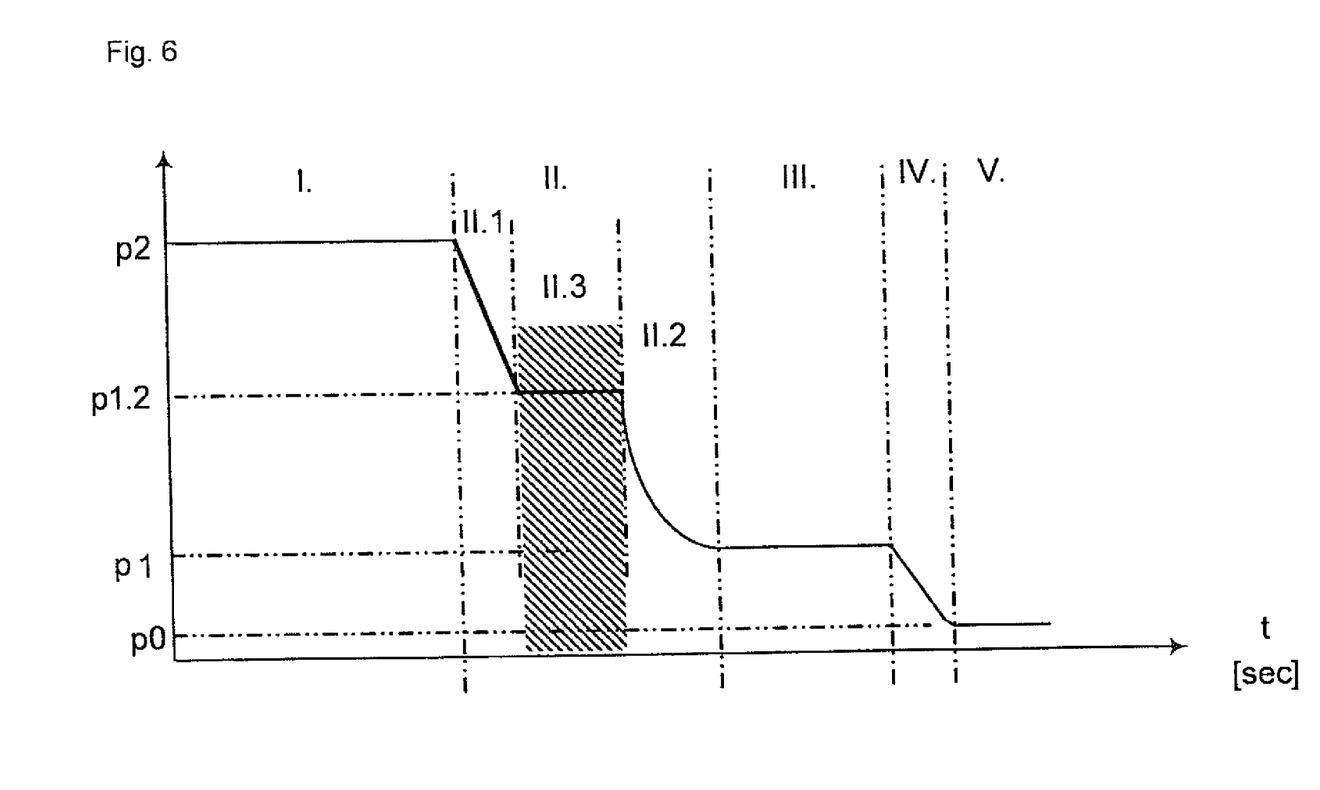
FIG. 6 a graph of the chronological pressure development of the internal pressure of the container during a shaping and filling phase and during the subsequent carbonation and depressurizing of the container to ambient pressure.

The difference between the partial depressurization pressure p1.1 and the pre-depressurization pressure p1 in phase II.1 is preferably around 30% to 50% of the difference between the shaping and filling pressure p2 and the pre-depressurization pressure p1. The latter applies in particular with the shaping and filling of the containers 2 with a carbonated filling substance or with components of a carbonated filling substance. In an alternative, namely a method in which, for the shaping and filling of the particular container 2, an exclusively still filling substance is first introduced into it and, after a partial depressurization, the carbonation of the filling substance occurs, the partial depressurization pressure p1.2 stands at the usual carbonation pressures, from 5 to 8 bar, whereby the necessary partial depressurization pressure p1.2 likewise falls with a falling temperature of the filling substance. FIG. 6 shows in a graph the chronological dependence of the internal pressure of the container 2 during the shaping and filling phase I, the pre-depressurization phase II with a carbonation phase II.3, the settling phase III, the residual depressurization phase IV and after the depressurization to the ambient pressure (graph section V). The method illustrated in FIG. 6 differs from the method in FIG. 4 substantially only in that the pre-depressurization is carried out in a first depressurization stage to the carbonation pressure p1.2, and then the carbonation with gaseous CO2 or liquid H2CO3 is carried out so that the pre-depressurization phase has two partial phases II.1 and II.2, between which is the carbonation phase. The pressure course is illustrated in the graph as isobars, whereby in operation a slight pressure rise can occur and be tolerated. There is then a rest phase III.

After the pre-depressurizing to the pre-depressurization pressure in the range from 1.2 bar to 2.5 bar, at this pre-depressurization pressure, the settling phase III takes place, which lasts at least 0.5 seconds and in exceptional cases at most 4 seconds, usually lies in the range of 0.6 to 1.5 seconds. The rapid residual depressurization phase follows this.

Insofar as in the various phases, there is a time control, the corresponding control times are transferred inter alia empirically and/or taking into account various method parameters and deposited for example in a data memory allocated to the shaping and filling machine 10 or the installation 1. The main parameters for the cycle and control times are for example the speed of rotation of the rotor 12, the pressure, temperature and/or CO2 content of the filling substance, the size and/or shape of the containers 2, the stretching speed etc.

Before the filled containers 2 are sealed, unwanted residual air and/or gas still in the headspace of the containers 2 are forced out for example, by for example a jet of the inert gas, for example a nitrogen jet, being introduced by means of at least one nozzle 42 into the particular container 2 through its container mouth 2.1, said jet not only filling the headspace with the inert gas and thus removing unwanted residual air and/or gas from the headspace, but, in the case of a carbonated filling substance, at the same time effecting a controlled foaming, this being likewise to force out unwanted residual air and/or vapor and/or gas.

The invention was described above using examples of embodiments. It is clear that numerous modifications and variations are possible without thereby departing from the inventive idea underlying the invention.

| Reference drawing list | |
|---|---|
| 1 | Installation |
| 2 | Container |
| 2.1 | Container mouth |
| 2.2 | Container base |
| 2.3 | Mouth flange |
| 3 | Preform |
| 3.1 | Open end of the preform |
| 3.2 | Base of the preform |
| 3.3 | Mouth flange |
| 4.1 | Mold |
| 5 | Seal |
| 6 | Conditioning installation of the preforms 3 |
| 7 | Heating installation |
| 8, 9 | Section of the installation 6 |
| 10 | Shaping and filling machine |
| 11 | Machine rack |
| 12 | Rotor |
| 13, 14, 15 | Annular vessel |
| 16 | Rotary opening |
| 17 | Inert gas connection |
| 18 | Inert gas holding tank |
| 19 | Compressor |
| 20 | Control installation |
| 21, 21.1, 22 | Pressure sensor |
| 23 | Inert gas connection |
| 24, 25 | Control valve |
| 26 | Vent line |
| 27 | Stretching rod |
| 27.1 | Rounded end of the stretching rod |
| 28 | Annular seal |
| 29 | Bearing head |
| 30 | Annular seal |
| 31 | Channel in the stretching rod 27 |
| 32 | Outlet opening |
| 33 | Check valve |
| 34 | Sphere |
| 35 | Spring |
| 36 | Liquid connection |
| 37 | Stop and switching valve |
| 38 | Return gas channel |
| 39 | Control valve |
| 40 | Return gas line |
| 41 | Installation for sealing |
| 42 | Nozzle |
| 43 | Sensor unit |
| 44 | Data line/connection |
| A, B | Direction of transportation of the preforms 3 |
| C, D | Direction of transportation of the containers 2 |
| Ma | Machine axis |
| RA | Axis of the stretching rod |

The invention claimed is:

1. A method for producing filled containers from preforms made of a thermoplastic material, the method comprising the steps of: at least thermally conditioning a preform; reshaping the preform during a shaping and filling phase in a mold under pressure of a supplied filling substance to form a particular container under a shaping and filling pressure, whereby the preform during the shaping and filling phase at least for a time is fed through a stretching rod and/or stretched in an axial direction, and whereby at least at an end of the shaping and filling phase, the particular container has an internal pressure matching the shaping and filling pressure; and depressurizing the shaped and filled container to atmospheric or ambient pressure after the end of the shaping and filling phase in an at least two-stage depressurization phase, wherein a duration of the at least two-stage depressurization phase of the particular containers from the shaping and filling pressure to the ambient pressure is controlled depending on a temperature of the filling substance, whereby the duration of the depressurization and/or the duration of at least one partial phase of the depressurization increases with a rising temperature of the filling substance.

2. The method according to claim 1, wherein the internal pressure of the shaped and filled container, after the shaping and filling phase, is in an at least one-stage pre-depressurization phase lowered to a pre-depressurization pressure, the internal pressure of the container is held at a constant or substantially constant pressure corresponding to the pre-depressurization pressure, in at least one settling phase following the pre-depressurization phase, and in an at least one-stage residual depressurization phase following the at least one settling phase, the depressurizing of the container to the atmospheric or ambient pressure occurs.

3. The method according to claim 2, wherein a chronological course of the internal pressure of the container during the depressurizing is selected so that a gradient in the chronological course at the end of at least one phase is equal to the chronological pressure course of a subsequent phase, whereby the chronological course of the internal pressure of the container at the end of the pre-depressurization phase with a gradient of zero or substantially zero transitions into the chronological course of the internal pressure of the container of the at least one settling phase.

4. The method according to claim 2, wherein the at least one-stage pre-depressurization phase is carried out in at least two stages with at least two partial phases, wherein the internal pressure of the container is lowered in a first partial phase to a partial depressurization pressure, and the chronological courses of the internal pressure of the container during the partial phases differ in terms of gradient/course of pressure development or in terms of the chronological course of the gradient and/or have a different gradient at a transition between the at least two partial phases.

5. The method according to claim 1, wherein, after the shaping and filling of the particular container, the internal pressure of the container during a settling phase is held at a constant or substantially constant pressure corresponding to the shaping and filling pressure.

6. The method according to claim 1, wherein the shaping and filling of the particular container with a carbonated filling substance takes place in at least two process phases such that in different process phases, filling substances with different CO2 contents and/or at different temperatures are supplied, including in a first process phase one component of the filling substance without a CO2 content or with a reduced CO2 content and in a further process phase a further component of the filling substance with a higher CO2 content.

7. The method according to claim 6, wherein the component of the filling substance with the higher CO2 concentration has a reduced temperature compared to the other component and/or is cooled before its addition, and/or the at least one component with the higher CO2 concentration is introduced as a sublayer into the filling substance already in the container or in the arising container.

8. The method according to claim 4, wherein the shaping and filling pressure is up to 20 bar and/or the pre-depressurization pressure is 10% to 30% of the shaping and filling pressure, and/or the partial depressurization pressure is at most equal to half a difference between the shaping and filling pressure and the pre-depressurization pressure.

9. The method according to claim 8, wherein the shaping and filling pressure is 8 bar to 15 bar.

10. The method according to claim 8, wherein the pre-depressurization pressure is at least 1.2 bar and at most 2.5 bar.

11. The method according to claim 10, wherein the pre-depressurization pressure is in the range of 1.4 bar to 2.3 bar.

12. The method according to claim 10, wherein the pre-depressurization pressure is in the range from 1.2 bar and 1.7 bar.

13. The method according to claim 8, wherein the partial depressurization pressure corresponds to about 30% of the difference between the shaping and filling pressure and the pre-depressurization pressure and is in a range of 6 bar to 8 bar.

14. The method according to claim 4, wherein an entire duration of the pre-depressurization phase is at least 0.1 seconds and at most 1.0 seconds, and/or the entire duration of the at least one settling phase following the partial depressurization phase is at least 0.5 seconds and at most 2 seconds, and/or the entire duration of the at least one-stage residual depressurization phase is at least 0.1 seconds and at most 0.5 seconds.

15. The method according to claim 14, wherein the entire duration of the pre-depressurization phase is in a range of 0.2 seconds to 0.4 seconds.

16. The method according to claim 14, wherein the entire duration of the at least one settling phase is in a range of 0.6 seconds to 1 second.

17. The method according to claim 14, wherein the entire duration of the at least one-stage residual depressurization phase is in a range of 0.1 seconds to 0.2 seconds.

18. The method according to claim 4, wherein the shaping and filling phase and/or the at least two-stage depressurization phase and/or the at least two partial phases of the at least one-stage pre-depressurization phase and/or the at least one settling phase and/or the at least one residual depressurization phase is carried out depending on a rotational position of a rotor which has a plurality of molds and is driven around a vertical machine axis and/or by time control, wherein the time control includes taking into account parameters specific to the filling substance and/or to the container, and whereby the time control is monitored and/or corrected by sensors capturing inflowing quantity of filling substance and/or by temperature and pressure sensors.

19. The method according to claim 18, wherein the parameters include at least one of the type of filling substance, temperature, $CO_2$ content of the filling substance, level of the shaping and filling pressure, and size and type of the containers.

20. The method according to claim 1, wherein the shaping and filling of the containers takes place with a still, $CO_2$-free liquid filling substance, and after the shaping and filling phase a carbonation of the filling substance in the container by introducing gaseous $CO_2$ or liquid $H_2CO_3$ is carried out, after the lowering of the internal pressure of the container to a carbonation or pre-depressurization pressure lying below the shaping and filling pressure.

21. The method according to claim 4, wherein the duration of the at least two-stage depressurization phase of the particular containers from the shaping and filling pressure to the ambient pressure is controlled by changing the duration of the depressurization and/or the at least two partial phases of the at least one-stage pre-depressurization phase and/or a level of the pre-depressurization pressure and/or at least one partial depressurization pressure.

22. The method according to claim 21, wherein a pressure level to be selected when depressurizing and/or carbonating the particular containers from the shaping and filling pressure to the ambient pressure is controlled depending on a temperature of the filling substance, by changing the pressure levels of the carbonation pressure and/or of the at least one partial depressurization pressure, whereby the necessary pressure levels rise with a rising temperature of the filling substance.

23. The method according to claim 1, wherein an interior of the preform is purged with an inert gas before the shaping and filling phase, and/or the preform is pre-stretched at a start of the shaping and filling phase with an inert gas at a pressure which matches or substantially matches the shaping and filling pressure, and/or the preform is sterilized at least on its internal surfaces before the shaping and filling phase.

* * * * *